(12) United States Patent
Zhuang et al.

(10) Patent No.: US 7,986,321 B2
(45) Date of Patent: Jul. 26, 2011

(54) SYSTEM AND METHOD FOR GENERATING STRUCTURED LIGHT FOR 3-DIMENSIONAL IMAGE RENDERING

(75) Inventors: Ping Zhuang, North Potomac, MD (US); Leslie Ray Elkins, Derwood, MD (US)

(73) Assignee: Spatial Integrated Systems, Inc., Rockville, MD (US)

( * ) Notice: Subject to any disclaimer, the term of this patent is extended or adjusted under 35 U.S.C. 154(b) by 876 days.

(21) Appl. No.: 11/968,559

(22) Filed: Jan. 2, 2008

(65) Prior Publication Data
US 2009/0169095 A1  Jul. 2, 2009

(51) Int. Cl.
  G06T 15/50    (2011.01)
  G06T 15/60    (2006.01)
  G06K 9/00     (2006.01)
  G02B 17/00    (2006.01)
  G03H 1/10     (2006.01)

(52) U.S. Cl. .......... 345/426; 345/440; 359/10; 359/603; 382/154; 382/207; 382/211

(58) Field of Classification Search ................. 382/154, 382/207, 211; 359/10, 603
See application file for complete search history.

(56) References Cited

U.S. PATENT DOCUMENTS

| | | | | |
|---|---|---|---|---|
| 4,175,862 A * | 11/1979 | DiMatteo et al. | ............ | 356/610 |
| 4,648,717 A * | 3/1987 | Ross et al. | .............. | 356/610 |
| 5,719,954 A | 2/1998 | Onda | | |
| 6,049,384 A * | 4/2000 | Rudd et al. | .............. | 356/603 |
| 6,262,803 B1 * | 7/2001 | Hallerman et al. | .......... | 356/603 |
| 6,512,844 B2 | 1/2003 | Bouguet et al. | | |
| 6,549,288 B1 | 4/2003 | Migdal et al. | | |
| 6,559,954 B2 * | 5/2003 | Takata et al. | .............. | 356/604 |
| 6,700,669 B1 * | 3/2004 | Geng | .............. | 356/603 |
| 7,103,212 B2 | 9/2006 | Hager et al. | | |
| 7,146,036 B2 | 12/2006 | An Chang et al. | | |
| 7,164,789 B2 | 1/2007 | Chen et al. | | |
| 7,440,590 B1 * | 10/2008 | Hassebrook et al. | ......... | 382/108 |
| 2005/0088529 A1 | 4/2005 | Geng | | |
| 2006/0268153 A1 | 11/2006 | Rice et al. | | |
| 2007/0115484 A1 | 5/2007 | Huang et al. | | |
| 2008/0279446 A1 * | 11/2008 | Hassebrook et al. | ......... | 382/154 |

OTHER PUBLICATIONS

Bouguet, Jean-Yves, et al. "Method for recovering 3D surface shape based on grayscale structured lighting," CalTech Technical Report No. 136-93, California Institute of Technology, Pasadena, CA (1998).

Bouguet, Jean-Yves, et al. "Visual Methods For three-dimensional Modeling", PhD Thesis, Chapter 5, California Institute of Technology, Pasadena, CA (1999).

(Continued)

*Primary Examiner* — M Good Johnson
(74) *Attorney, Agent, or Firm* — Womble Carlyle

(57) ABSTRACT

A system and method for illuminating an object in preparation for three-dimensional rendering includes a projection device configured to project at least three two-dimensional structured light patterns onto a 3-dimensional object. At least two cameras detect light reflected by the object in response to the at least three structured light patterns. Each structured light pattern varies in intensity in a first dimension and is constant in a second dimension. A single line along the first dimension of a given structured light pattern is created from a superposition of three or more component triangular waveforms. Each component triangular waveform has an amplitude, a periodicity (frequency), and a phase shift which is implemented as a pixel shift. Each component triangular waveform may be subject to one or more waveshaping operations prior to being summed with the remaining component triangular waveforms. The summed waveform itself may also be subject to waveshaping operations.

21 Claims, 8 Drawing Sheets

OTHER PUBLICATIONS

Hirschmuller, H., et al., "Real-Time Correlation-Based Stereo Vision with Reduced Border Errors", Int'l J. Computer Vision, v. 47 (1/2/3) pp. 229-246, Kluwer Academic (2002).

Zhang, S., et al., "High-Resolution, Real-time 3D Shape Acquisition", Proceedings of the 2004 Conference on Computer Vision and Pattern Recognition Workshop (CVPRW'04) vol. 3 (2004).

* cited by examiner

SYSTEM AND METHOD FOR GENERATING STRUCTURED LIGHT FOR 3-DIMENSIONAL IMAGE RENDERING

BACKGROUND OF THE INVENTION

1. Field of the Invention

The present invention is directed to a method and system for generating a sequence of structured light patterns for use in illuminating a three-dimensional object in preparation for 3-D digital data capture and object rendering.

2. Background

U.S. Pat. No. 6,512,844 to Bouguet et al., entitled "3D Rendering", discloses a technique for capturing the surface of three-dimensional ("3D") objects using structured lighting. The movement of a shadow, formed by a wand, stick or other pencil-like object, across a 3D object is optically recorded. Variation in brightness on the surface provides a cue for triangulation. By analyzing the variation in brightness of a particular point on the surface, the location of that point is determined based on the movement of the shadow. With known locations for a camera and a light source, the coordinates in space of the point is triangulated. By repeating this process, a collection of coordinates is created. Those coordinates are then used to reconstruct the 3D surface.

U.S. Pat. No. 6,549,288 to Migdal, et al., entitled "Structured-light, Triangulation-Based Three-Dimensional Digitizer", is directed to a system for illuminating an object with a special kind of structured light pattern, recording the shape of the reflected points of light by means of a camera, and reconstructing the 3D shape of the object through a computer using the data points collected from the reflection of the structured light pattern. The reconstruction is performed using a triangulation technique that does not depend on the fixed direction of the light source relative to the camera. The system stores several images of the objects with different illumination patterns. The data is subsequently processed, by a computer system which applies data processing routines, i.e., the model building algorithms which provide 3D surface generation. The data acquisition is simplified to acquiring of only two or, optionally, four images of the object, thereby significantly increasing the digitization speed over that of laser-based scanners. The light source projects both structured light and uniform illumination light from the same apparent source, and that allows for numerical normalization of the images.

U.S. Pat. No. 7,103,212 to Hager et al., entitled "Acquisition of Three-dimensional Images by an Active Stereo Technique Using Locally Unique Patterns" discloses a system and method for acquiring three-dimensional (3-D) images of a scene. The system includes a projection device for projecting a locally unique pattern (LUP) onto a scene, and sensors for imaging the scene containing the LUP at two or more viewpoints (i.e., at two or more cameras). A computing device matches corresponding pixels in the images by using the local uniqueness of the pattern to produce a disparity map. A range map can then be generated by triangulating points in the imaged scene.

U.S. Pat. No. 7,146,036 to An Chang et al., entitled "Multiframe Correspondence Estimation", is directed to systems and methods of multiframe correspondence estimation. Light patterns reflected from the scene are captured at one or more capture planes (i.e., at one or more cameras). In one aspect, a sequence of patterns of light symbols that temporally encode two-dimensional position information in a projection plane with unique light symbol sequence codes is projected onto a scene. A correspondence mapping between multipixel regions in the capture plane and corresponding regions in the projection plane is computed based at least in part on correspondence between light symbol sequence codes captured at the capture plane and light symbol sequence codes projected from the projection plane. In another aspect, the patterns consist of a single plane of light that is swept across the scene. Correspondence is determined based at least in part on exploiting the epipolar constraint associated with any pair of cameras.

U.S. Published Patent Application No. 2005/0088259 to Geng, entitled "System and Method For Three-Dimensional Imaging Systems, discloses an approach for acquiring a surface profile 3D data set of an object. The approach includes illuminating a surface of the object with a sequence of multiple rainbow projection (MRP) structural light patterns, capturing light reflected from the object, and calculating 3D data (X, Y, Z) for each visible point on the object based upon triangulation mathematical principles of the captured reflected light.

U.S. Published Patent Application No. 2007/0115484 to Huang et al., entitled "3D Shape Measurement System and Method Including Fast Three-Step Phase Shifting, Error Compensation and Calibration", discloses a structured light system for object ranging/measurement. The disclosed system implements a trapezoidal-based phase-shifting function with intensity ratio modeling using sinusoidal intensity-varied fringe patterns to accommodate for defocus error. The structured light system includes a light projector constructed to project at least three sinusoidal intensity-varied fringe patterns onto an object that are each phase shifted with respect to the others, a camera for capturing the at least three intensity-varied phase-shifted fringe patterns as they are reflected from the object and a system processor in electrical communication with the light projector and camera for generating the at least three fringe patterns, shifting the patterns in phase and providing the patterns to the projector, wherein the projector projects the at least three phase-shifted fringe patterns sequentially, wherein the camera captures the patterns as reflected from the object and wherein the system processor processes the captured patterns to generate object coordinates.

One problem with using waveforms having a sinusoidal intensity is to illuminate an object for 3-D rendering, such as disclosed in U.S. patent application no. 2007/0115484, is that ambiguities may arise during image matching. These ambiguities are the result of the very small differences in intensity from one pixel to the next, near the peaks and troughs of the waveform.

SUMMARY OF THE INVENTION

In one aspect, the present invention is directed to a method of illuminating an object in preparation for three-dimensional rendering. The method comprises providing a light projector having a field of view which includes said object, creating three two-dimensional structured light patterns, and illuminating said object with each of the three two-dimensional structured light patterns, in succession. Each structured light pattern is derived from a corresponding aperiodic waveform replicated in a second dimension, each aperiodic waveform being derived from the same set of component triangular waveforms, wherein a given aperiodic waveform is created using a unique set of phase shifts applied to members of said same set of component triangular waveforms.

Each of the component triangular waveforms may have a unique periodicity, with no periodicity being an exact multiple of another periodicity. At least three component triangular waveforms may be summed to form each of said aperiodic waveforms. If desired, exactly four component triangular waveforms are summed to form each of said aperiodic waveforms.

Each component triangular waveform may comprise a train of isosceles triangles.

Each aperiodic waveform may be subject to signal conditioning, prior to creating the three two-dimensional structured light patterns. The signal conditioning may include gamma correcting pixels of said each periodic waveform, and then rescaling pixels of said each periodic waveform in accordance with a capability of the light projector.

In the inventive method of illuminating an object, the step of creating may comprise all of the following: (a) obtaining four triangular waveforms, each triangular waveform having a predetermined amplitude and predetermined periodicity; (b) phase shifting each triangular waveform by a predetermined amount; (c) summing the phase shifted triangular waveforms to thereby form an aperiodic summed waveform; (d) gamma correcting each pixel in the aperiodic summed waveform; by a gamma factor to form a gamma-corrected waveform; (e) rescaling the gamma-corrected waveform to conform to the pixel value range of the projection device, thereby forming a one-dimensional illuminating waveform; (f) replicating the one-dimensional illuminating waveform in a second dimension to form a two-dimensional structured light pattern; and (g) repeating steps (b)-(f) at least two more times with different combinations of phase shifts to form a total of at least three two-dimensional structured light patterns.

In another aspect, the present invention is directed to a method of performing three-dimensional rendering of an object. The method comprises providing a light projector and at least two spaced apart cameras in a known configuration relative to one another, wherein the object is within a field of view of said light projector and also said at least two spaced apart cameras; creating three two-dimensional structured light patterns, each structured light pattern being derived from a corresponding aperiodic waveform replicated in a second dimension, each aperiodic waveform being derived from the same set of component triangular waveforms, a given aperiodic waveform being created using a unique set of phase shifts applied to members of said same set of component triangular waveforms; illuminating the object with each of the three two-dimensional structured light patterns and capturing three images of illuminated object with each camera to thereby from a plurality of sets of three images, each set of three images being captured by one camera; and processing the plurality of sets of images to form a three-dimensional surface model of the object.

In yet another aspect, the present invention is directed to a computer memory having stored thereon a set of three two-dimensional structured light patterns, each structured light pattern comprising a plurality of pixels having pixel intensities which vary in a first dimension and are constant in a second dimension. Each structured light pattern is derived from a corresponding aperiodic waveform replicated in a second dimension, and each aperiodic waveform is derived from the same set of component triangular waveforms. In addition, a given aperiodic waveform is created using a unique set of phase shifts applied to members of said same set of component triangular waveforms.

In still another aspect, the present invention is directed to a structured light system capable of illuminating an object in preparation for three-dimensional rendering. The system includes a light projector, and the aforementioned computer memory.

The system may further comprise a computer and at least two digital cameras configured to feed output to the computer, wherein the relative positions of focal planes of the cameras are known to the computer.

DETAILED DESCRIPTION OF THE INVENTION

The contents of aforementioned U.S. Pat. Nos. 6,512,844, 6,549,288, 7,103,212 and 7,146,036, and aforementioned U.S. Published Application Nos. 2005/0088259 and 2007/0115484, are incorporated by reference to the extent necessary to understand the present invention.

Figure 1:
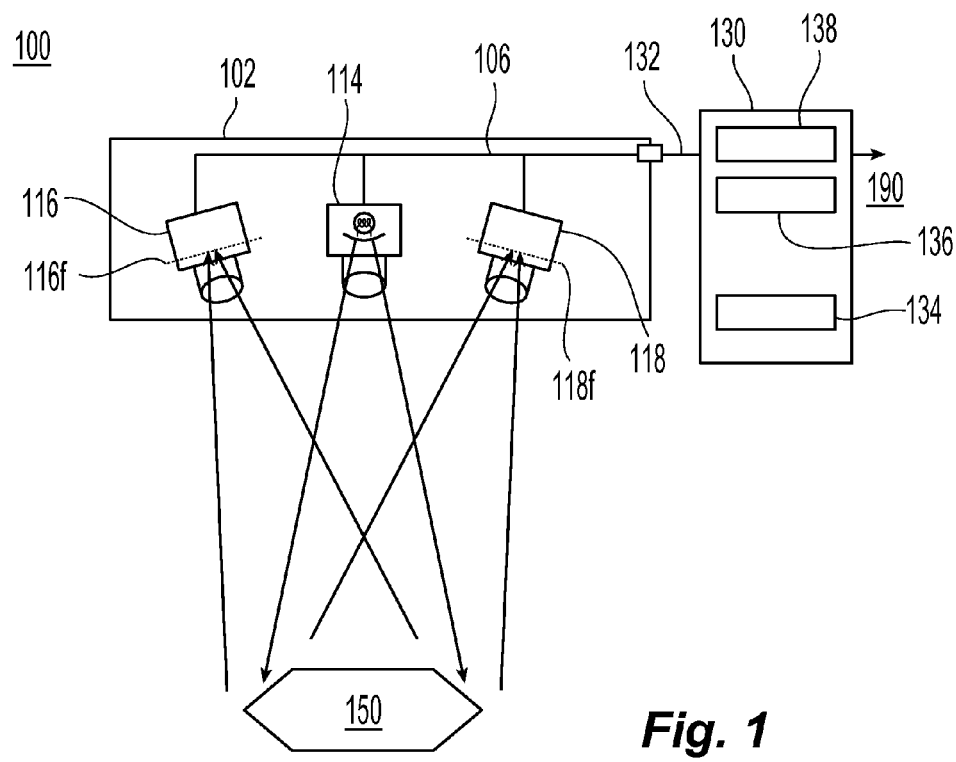
FIG. 1 shows an exemplary system for performing 3-D rendering of an object, in accordance with one embodiment of the present invention.

FIG. 1 shows a system 100 configured to illuminate a 3-dimensional object 150 with structured light and subsequently capture and process structured light reflected by the object 150. The object 150 can be any 3-dimensional item, such a person's face or body, an inanimate structure or other item of interest which can be brought within the field of view of the system.

The system 100 includes an illumination/capture device 102 connected to a computer 130. The system 100, or at least a component thereof, preferably is connected to a network 190, such as a local area network or even the internet. In the latter case, the system 100 (or the computer 130) has a address, such as an IP-v6 address.

In the embodiment shown, the computer 130 is shown to be separate from the illumination/capture device 102, but physically connected thereto by a cable 132. In other embodiments, however, the computer 130 may be connected to the illumination/capture device 102 via a wireless link, such as a Bluetooth link. In still other embodiments, the computer 130 and the illumination/capture device 100 are integrated into a unitary housing.

The illumination/capture device 102 comprises a housing 112 which accommodates a light projector 114, a first camera 116 and a second camera 118. A bus 106, which is electrically connected to the cable 132, connects the projection device 114 and the two cameras 116, 118. The light projector 114 and the two cameras 116, 118 are rigidly mounted within the housing 112 so that they do not move relative to one another. Furthermore, the relative positions of the illumination/capture device 102 and the two cameras are known to the computer 130, for reasons discussed below. By virtue of the light projector 114 and the two spaced apart cameras 116, 118, at least one embodiment of the present invention comprises a 3-D rendering system that employs structured light for illumination and stereo vision for detection.

The light projector 114 is capable of projecting a two-dimensional image having a pattern specified in a pixel memory array. Typically, the pixel memory array may be part of a memory 138 associated with the computer 130, although it may instead or also be part of the light projector 114. In one embodiment, the light projector 114 is a commercial off-the-shelf digital light projector (DLP). It is noted, however, that other light projectors employing one or more of a variety of technologies capable of displaying the desired pattern may be employed. Thus, in the present context, the term "light projector" is intended to cover projection devices employing DLP, LEDs, CRTs, fiber optic systems, laser illumination and even slide projectors which accommodate a series of slides projecting the precomputed 2D images discussed herein.

The cameras 116, 118 are digital cameras, each capable to capturing light reflected by the object of interest 150. In one embodiment, the camera has a CCD array, a CMOS array, or the like, which is configured to capture an image along a corresponding focal plane 116f, 118f, respectively. In one embodiment, each camera 116, 118 comprises model no. FFMV-03MTM-CS available from the Point Grey Research, Inc. It is understood, however, that other digital cameras may be used instead.

While only two cameras are shown in the embodiment of FIG. 1, it is understood that three or more spaced apart cameras may be used, as seen in FIG. 1 of aforementioned U.S. Pat. No. 7,103,212 to Hager, et al. It is noted, though, that when three or more cameras are used, there is no requirement that the cameras lay in the same plane. What is desired, however, is that the relative positions of the focal planes of the cameras be known, since this information facilitates pixel matching along epipolar lines. Additionally, it may even be possible to use a single camera and projector, but this requires that the camera and projection system be calibrated together so that the projection system's optics can be included in the computation of the epipolar lines.

Prior to using the system 100 on an object 150, the working field of view should be defined. For this, the light projector 114 and the cameras 116, 118 should be calibrated to establish minimum and maximum depth of view, and also to establish the geometry of the cameras' field of view, in all directions.

The computer 130 has two important functions, depicted as function blocks 134 and 136. The function blocks 134 and 136 may entirely be implemented in software to be executed on the computer's processor, or may be at least partially implemented using specialized co-processors, ASICs, or other hardware.

Function block 134 processes images from the cameras 116, 118 to perform 3-D rendering of the object of interest. For this, function block 134 employs an approach that matches image points on a pair of stereo images using epipolar line analysis techniques known to those skilled in the art. U.S. Pat. No. 5,719,954, whose contents are incorporated by reference, discloses a suitable approach for present purposes.

Function block 136 creates the two-dimensional structured light patterns which are projected by the light projector 114 onto the object 150.

Figure 2:
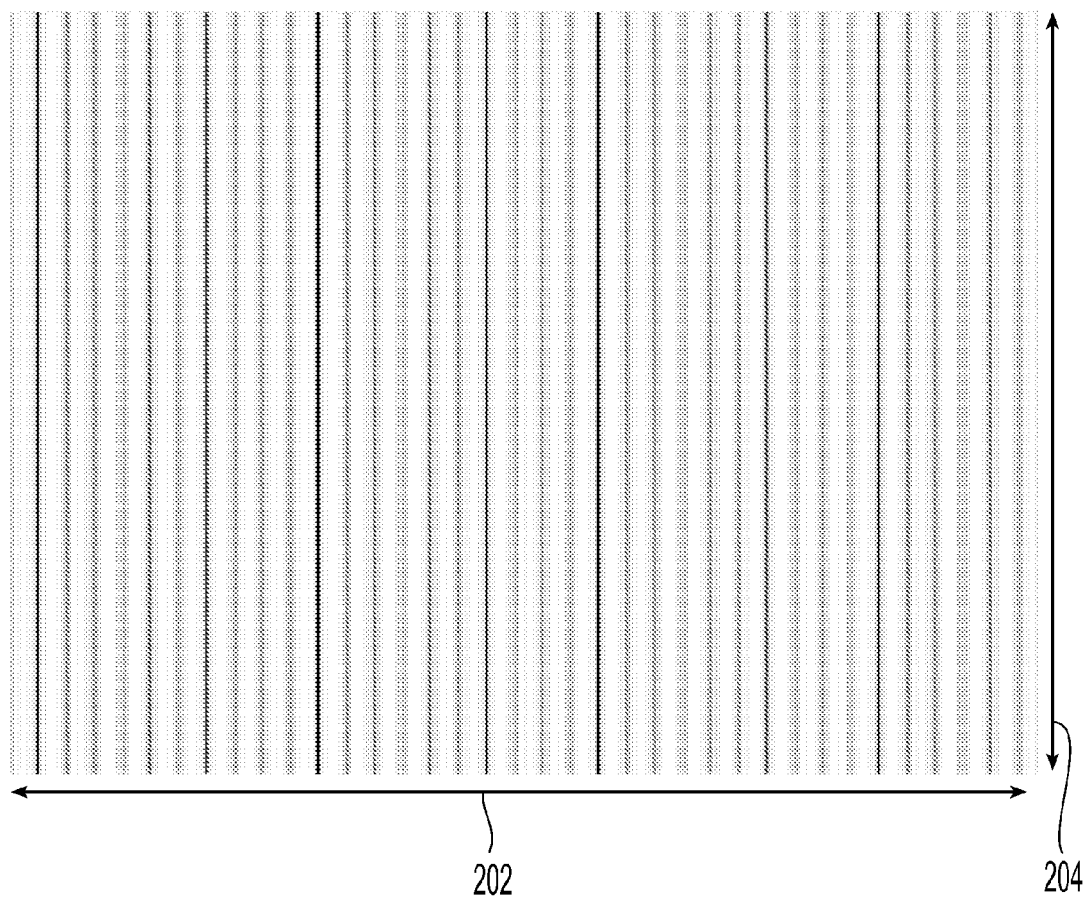
FIG. 2 shows an exemplary structured light pattern in accordance with one embodiment of the present invention.

FIG. 2 shows a portion of an exemplary two-dimensional structured light pattern 200 of sort created by function block 136, in accordance with one embodiment of the present invention. In FIG. 2, only 256 columns of the structured light pattern are shown. In one embodiment, a complete two-dimensional structured light pattern may have on the order of N=768 rows and M=1024 columns of pixels. It is understood, however, that other image sizes may instead be used, depending on the capabilities of the projection device used to illuminate an object.

The intensity of light in the structured light pattern 200 varies in a first dimension 202 and is constant in a second dimension 204 that is perpendicular to the first dimension. As seen in the exemplary embodiment of FIG. 2, the light intensity (i.e., the pixel values) of the structured light pattern varies 200 along the horizontal dimension 202, and is constant along the vertical dimension 204. It is understood, however, that one may equivalently employ a structured light pattern having constant light intensity along the horizontal dimension and a varying light intensity along the vertical direction. In the remainder of this disclosure, without loss of generality, we shall assume that the light intensity varies in the horizon direction.

To create the exemplary structured light pattern seen in FIG. 2, one need only generate a single line of pixel values, and then replicate this single line in the vertical dimension. In one embodiment, the structured light pattern 200 is stored in a memory 138 associated with the processor. In embodiments in which a plurality (e.g., two, three, or even more) of structured light patterns are used, all the structured light patterns may be stored in memory 138. The structured light pattern(s) stored in this memory 138 is/are then transferred to the light projector 114 which illuminates the object 190.

In some embodiments, for each structured light pattern, the processor is programmed to create a single line of pixels and then replicate this line before storing the pattern in memory 138. In other embodiments, the structured light pattern(s) is/are created beforehand and stored in a non-volatile memory associated with the computer 130, and so the processor is not used to create the structured light pattern(s). Either way, the structured light pattern(s) is/are stored in memory prior to being sent to the light projector 114.

In one embodiment, the single line of pixels is created by summing a plurality of component triangular waveforms. In contrast to a sinusoidal waveform, each such component triangular waveform is characterized by well-defined peaks and troughs and substantially linear portions between each peak and trough. Each such component triangular waveform has a minimum and a maximum pixel value (amplitude range), a periodicity (or, alternatively, the length of a single triangle's rise and fall) and a phase shift. In one embodiment, the minimum and maximum pixel values for a gray-scale image may range between 0-255 (8-bit pixels); the periodicity may be expressed as a length, in pixels, of a single triangle representing its rise to a peak and a return to its initial value; and the phase shift may be expressed as a number of pixels less than the length of a single triangle. Preferably, the periodicity is an odd-numbered integer so each triangle is symmetric about its peak. It is understood that in other embodiments, a different number of bits may be used for each pixel, the periodicity may simply be expressed as a spatial frequency, such as the number of cycles within the image, and the phase shift may be manifested as a decimal proportion ranging from 0.0 and 1.0.

The exemplary structured light pattern 200 of FIG. 2 comprises four component triangular waveforms. In other embodiments, a structured light pattern may comprise other numbers of component triangular waveforms, such as three, five and possibly even higher numbers, to form the single line of pixel values which then is replicated in the vertical direction.

Figure 3:
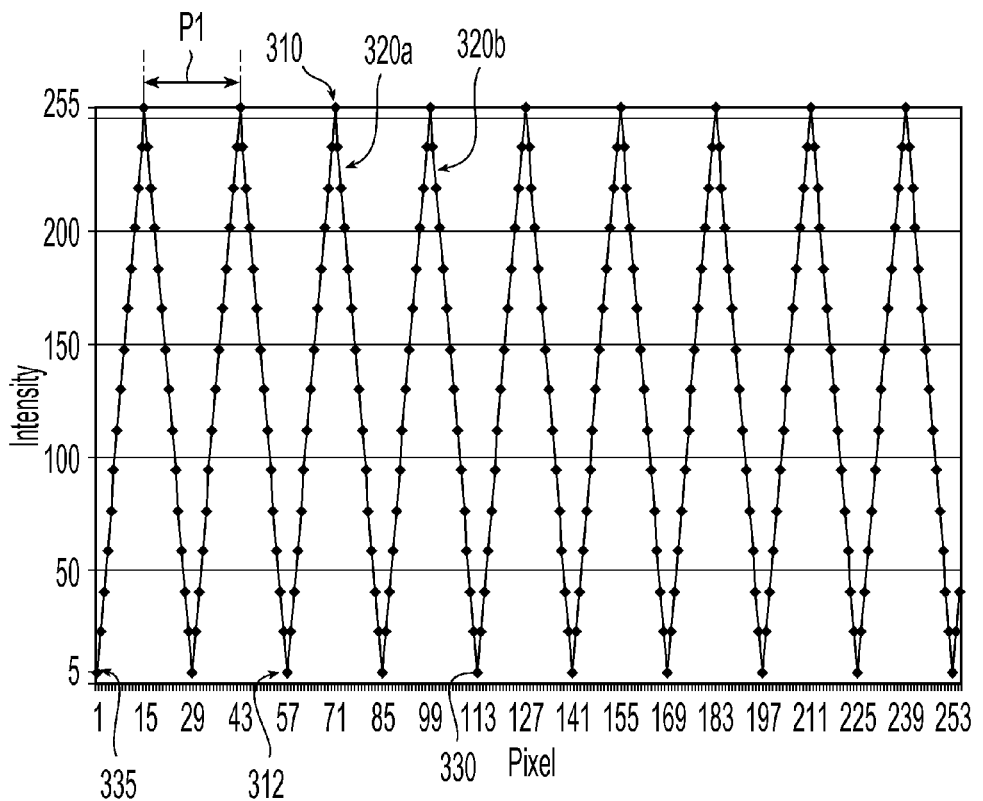
FIG. 3 shows a first exemplary triangular component waveform used to create the exemplary structured light pattern of FIG. 2.

FIG. 3 shows the first 256 pixels (samples) of a 1024 pixel-long first component triangular waveform 300 which is used to create a single line of pixel values. The first component triangular waveform 300 has a maximum pixel value of 255 and a minimum pixel value of 5. These are manifested in a first component peak 310 and a first component valley 312. The first component triangular waveform 300 has a periodicity P1=29 and so adjacent peaks are separated by 29 pixels, and the 15$^{th}$ pixel within a given period forms a peak. Cast in different terms, a total of roughly 1024/29≈35 cycles of triangles of length 29 pixels each, are present in a single line of length 1024-pixels. Given a pixel range of 255−5=250, and 14 steps between the minimum and maximum pixel values, the 8-bit integer pixel values of adjacent pixels in a given period differs by a first step size of either 17 or 18 (since 250/14≈17.8). Furthermore, the last pixel of one triangle 320a also serves as the first pixel of the following triangle 320b, so that the first component triangular waveform 300 comprises a succession of identical triangles, each pair of adjacent triangles sharing a valley pixel 330. The phase shift of the first component triangular waveform is zero pixels, and so the pixel value of the first pixel 335 is the minimum pixel value of 5.

Figure 4:
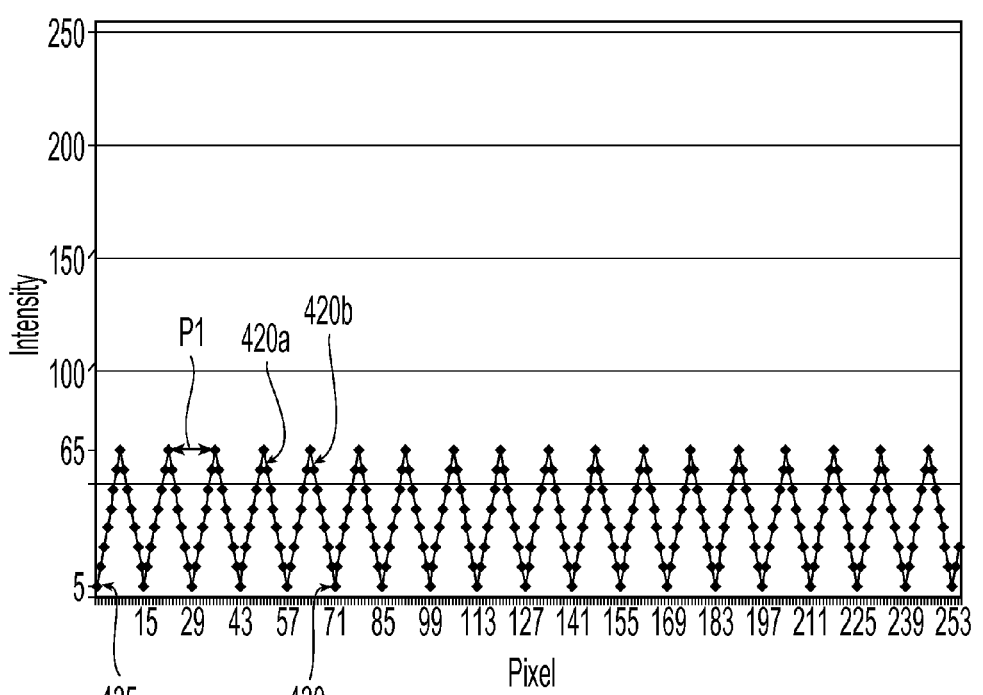
FIG. 4 shows a second exemplary triangular component waveform used to create the exemplary structured light pattern of FIG. 2.

FIG. 4 shows the first 256 pixels of a 1024 pixel-long second component triangular waveform 400. The second component triangular waveform 400 has a maximum pixel value of 65 and a minimum pixel value of 5. The second component triangular waveform 400 has a periodicity P2=15 and so adjacent peaks are separated by 15 pixels, and the 8$^{th}$ pixel within a period forms a peak. Given a pixel range of 65−5=60, and 7 steps between the minimum and maximum pixel values, the 8-bit integer pixel values of adjacent pixels in a given period differ by a second step size of either 8 or 9 (since 60/7≈8.5). Again, the last pixel of one triangle 420a also serves as the first pixel of the following triangle 420b, so that the second first component triangular waveform 400 comprises a succession of identical triangles, each pair of triangles sharing a valley pixel 430. The phase shift of the second component triangular waveform 400 is zero pixels, and so the pixel value of the first pixel 435 is the minimum pixel value of 5.

Figure 5:
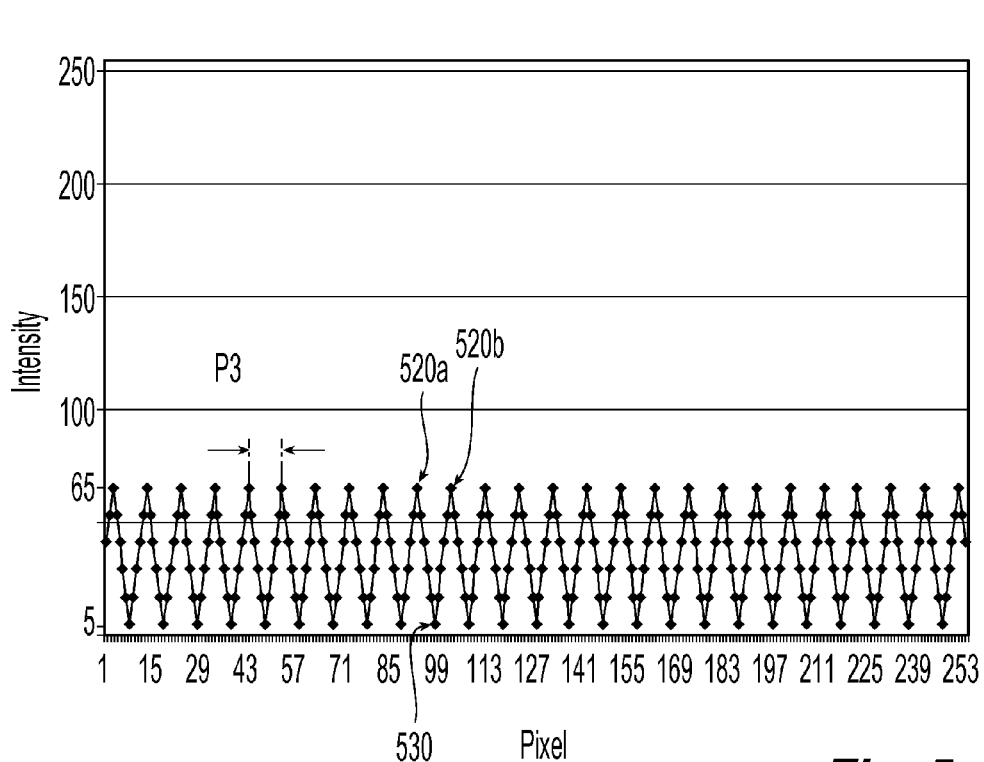
FIG. 5 shows a third exemplary triangular component waveform used to create the exemplary structured light pattern of FIG. 2.

FIG. 5 shows the first 256 pixels of a 1024 pixel-long third component triangular waveform 500. The third component triangular waveform 500 also has a maximum pixel value of 65 and a minimum pixel value of 5. The third component triangular waveform 500 has a periodicity P3=11 and so adjacent peaks are separated by 11 pixels, and the 6$^{th}$ pixel within a period forms a peak. Given a pixel range of 65−5=60, and 5 steps between the minimum and maximum pixel values, the 8-bit integer pixel values of adjacent pixels in a given period differ by a third step size of 12 (since 60/5=12). Again, the last pixel of one triangle 520a also serves as the first pixel of the following triangle 520b, so that the third component triangular waveform 500 comprises a succession of identical triangles, each pair of triangles sharing a valley pixel 530. The phase shift of the third component triangular waveform 500 is three pixels, and so the pixel value of the first pixel 535 is the same as that of the fourth pixel in an unshifted single triangle, which would be a pixel value of 41.

Figure 6:
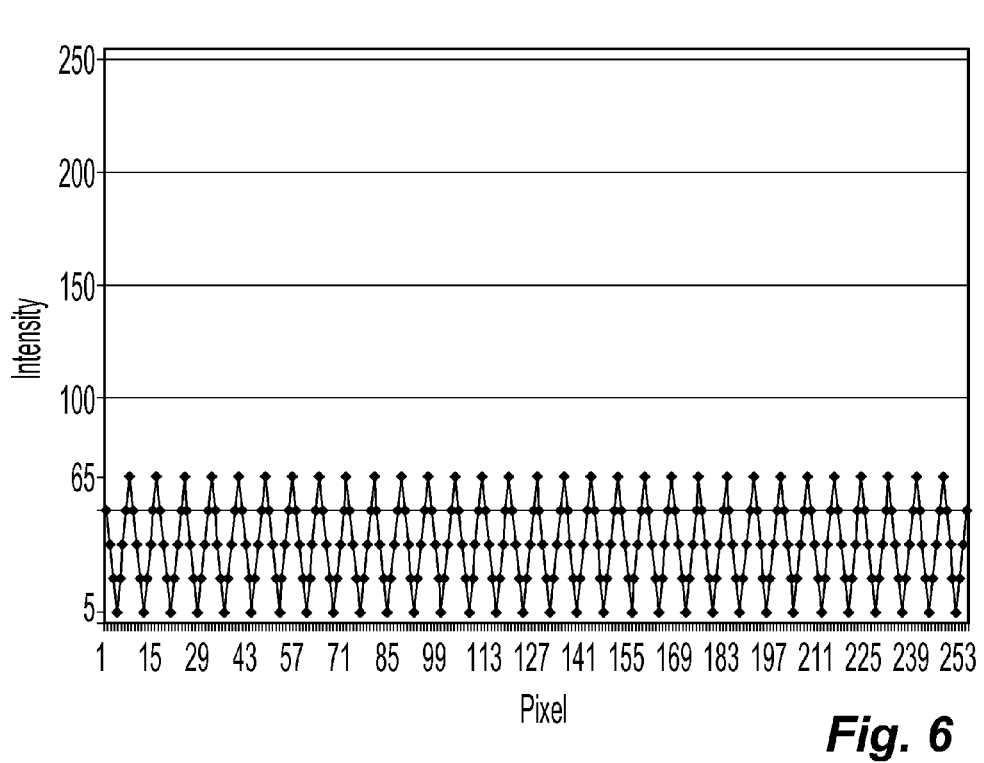
FIG. 6 shows a fourth exemplary triangular component waveform used to create the exemplary structured light pattern of FIG. 2.

FIG. 6 shows the first 256 pixels of a 1024 pixel-long fourth component triangular waveform 600. The third component triangular waveform 600 also has a maximum pixel value of 65 and a minimum pixel value of 5. The fourth component triangular waveform 600 has a periodicity P4=9 and so adjacent peaks are separated by 9 pixels, and the 5$^{th}$ pixel within a period forms a peak. Given a pixel range of 65−5=60, and 4 steps between the minimum and maximum pixel values, the 8-bit integer pixel values of adjacent pixels in a given period differ by a third step size of 15 (since 60/4=15). Again, the last pixel of one triangle 520a also serves as the first pixel of the following triangle 520b, so that the third component triangular waveform 500 comprises a succession of identical triangles, each pair of triangles sharing a valley pixel 530. The phase shift of the fourth component triangular waveform 600 is six pixels, and so the pixel value of the first pixel 535 is the same as that of the 6$^{th}$ pixel in an unshifted single triangle, which would be a pixel value of 50 (single step of 15 down, from the peak of 65).

Figure 7:
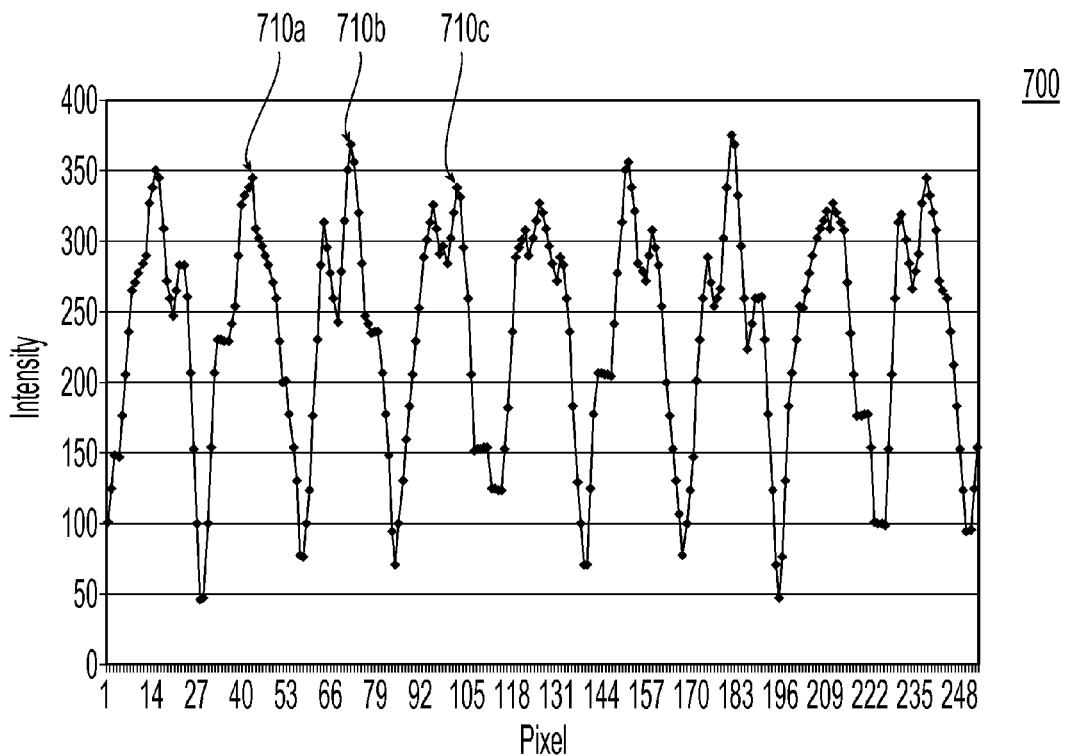
FIG. 7 shows a combined waveform comprising a sum of the exemplary triangular component waveforms of FIGS. 3-6.

FIG. 7 shows the first 256 pixels of an aperiodic summed waveform 700 created by summing the four component triangular waveforms 300, 400, 500 and 600, point-by-point. Due to the larger amplitude of the first component triangular waveform relative to the remaining component waveforms (maximum pixel value of 255 vs. 65), the aperiodic summed waveform 700 is dominated by peak regions 710a, 710b, 710c, etc. whose centers are spaced apart by roughly 29 pixels.

Figure 8:
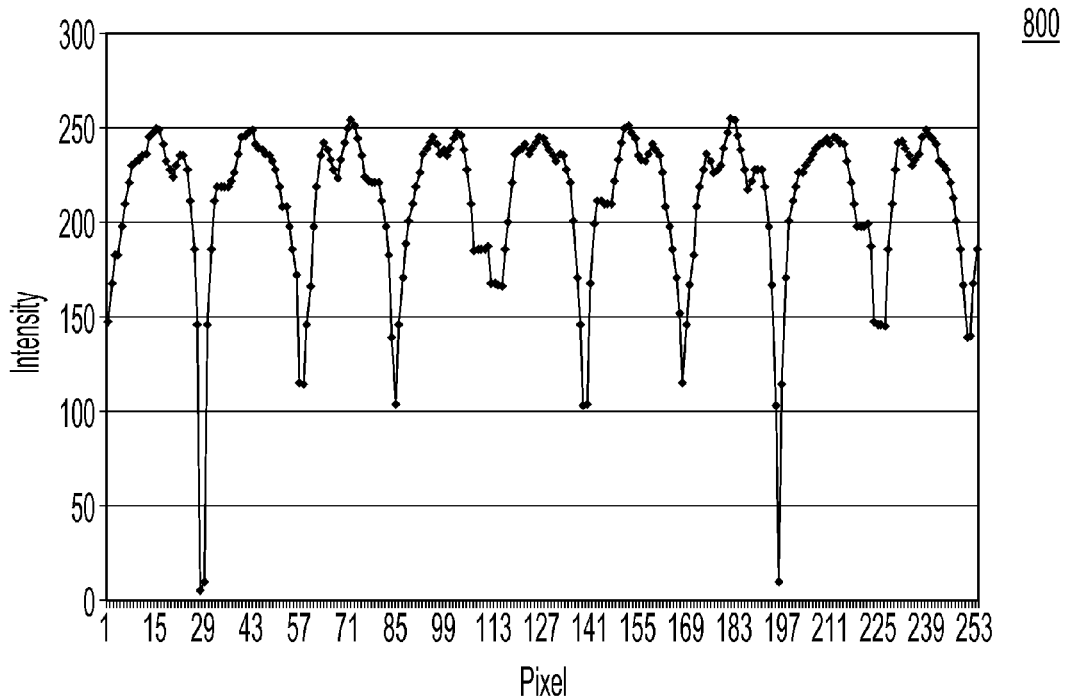
FIG. 8 shows a first waveform pattern derived from a linear combination of shifted versions of the exemplary triangular waveforms of FIGS. 3-6.

This aperiodic summed waveform 700 is subject to additional signal conditioning to form a first illuminating waveform 800 (see FIG. 8). The signal condition may include normalizing the aperiodic summed waveform 700, such as by scaling down all pixel values to fall within a range of 0.0-1.0, thereby forming a normalized waveform. The signal conditioning may also, or instead, include gamma correcting the waveform by raising each pixel value to some factor. In one embodiment, each pixel value is raised to a power of γ=0.9 to form a gamma-corrected waveform. The signal conditioning may also, or instead, include scaling up the waveform so that the pixel value range matches that of the projection device, thereby forming an illuminating waveform. In one embodiment, the light projector requires 8-bit pixel values and so the pixel values of the gamma-corrected waveform are scaled to between 5-250. It is understood, however, that in other embodiments, the pixel values may be scaled to another range of minimum and maximum values, while in still other embodiments, the light projector may require pixel values having some other number of bits.

In one embodiment, all three of these procedures are performed. The aperiodic summed waveform 700 is first normalized to thereby form a normalized waveform. The normalized waveform is then subject to gamma correction to form a gamma-corrected waveform. Next, the gamma-corrected waveform is scaled in accordance with the light projector to form the first illuminating waveform 800. Once the illuminating waveform has been created, it is replicated in the vertical dimension to form a first structured light pattern, such as image 200 (See FIG. 2).

Each of the four above-described component waveforms comprises a train of isosceles triangles, the triangles of a given component waveform rising and falling at substantially the same rate, subject to spatial sampling. It should be understood, however, that the triangular waveforms need not be of isoceles shape. Thus, in the present context, the term 'triangular waveform' is intended to encompass a waveform whose individual cycles comprise sides with substantially constant slopes (though different sides may have a different slope) and sharp peaks. The substantially constant slopes and relatively peaks and troughs of triangular waveforms contrast with, e.g., sinusoidal curves having varying slopes and relatively smooth peaks. After gamma correction, the summed waveforms are no longer triangular, but still retain relatively sharp peaks.

In accordance with one embodiment of the present invention, the light projector 114 outputs three such structured light patterns in rapid succession. Each of the three structured light patterns are formed from three corresponding illuminating waveforms which are replicated in the vertical direction. The three corresponding illuminating waveforms differ from one another in the phase shifts of the four component triangular waveforms. Table 1 shows one embodiment of the combinations of phase shift parameters that may be used with the four component triangular waveforms to create each of three aperiodic summed waveforms.

TABLE 1

Phase shifts for four component triangular waveforms to create three aperiodic summed waveforms

|  | Phase Shift (decimal and in pixels) for 1$^{st}$ Triangular Waveform period = 29; ampli = [5, 255] | Phase Shift (decimal and in pixels) for 2$^{nd}$ Triangular Waveform period = 15; ampli = [5, 65] | Phase Shift (decimal and in pixels) for 3$^{rd}$ Triangular Waveform period = 11; ampli = [5, 65] | Phase Shift (decimal and in pixels) for 4$^{th}$ Triangular Waveform period = 9; ampli = [5, 65] |
|---|---|---|---|---|
| Aperiodic Summed Waveform #1 | 0.0<br>0 pixels | 0.0<br>0 pixels | 0.3333<br>3 pixels | 0.6667<br>6 pixels |
| Aperiodic Summed Waveform #2 | 0.3333<br>9 pixels | 0.3333<br>5 pixels | 0.6667<br>7 pixels | 0.0<br>0 pixels |
| Aperiodic Summed Waveform #3 | 0.6667<br>19 pixels | 0.6667<br>10 pixels | 0.0<br>0 pixels | 0.3333<br>3 pixels |

Thus, in this example, all three aperiodic summed waveforms are created by the superposition of the same four component triangular waveforms, but with a different combination of the four phase shifts. Due to this linear superposition, all three aperiodic summed waveforms have the same total spectral energy. Furthermore, the three structured light patterns ultimately derived from the three aperiodic summed waveforms (and ultimately used to illuminate the object 150) more or less also have the same total spectral energy.

Figure 9:
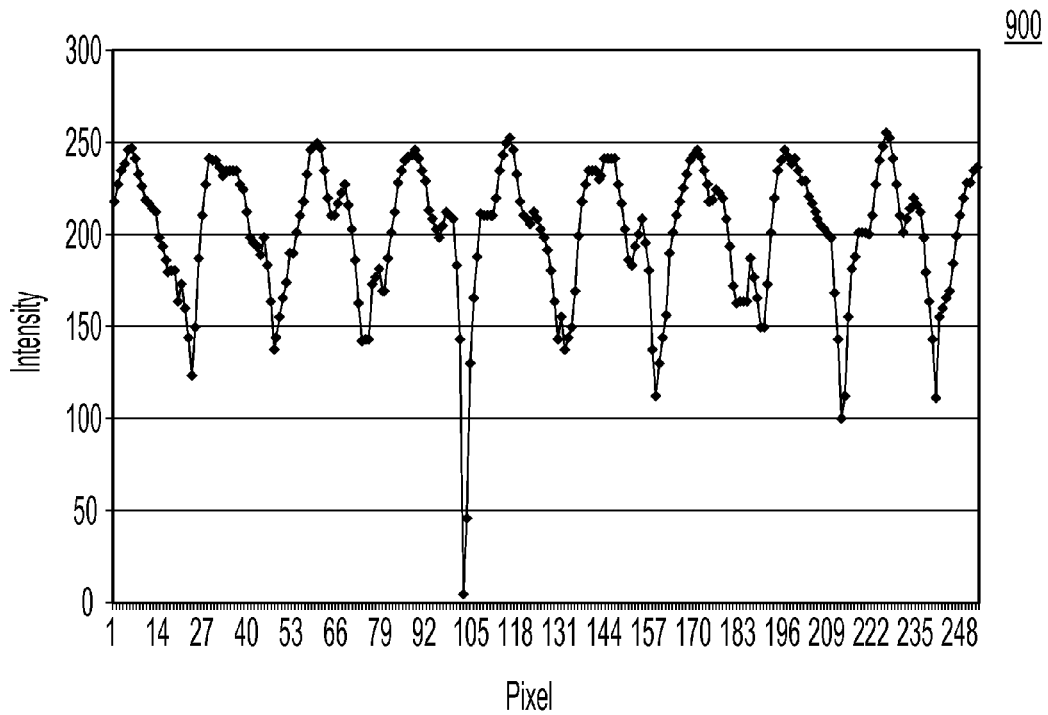
FIG. 9 shows a second waveform pattern derived from a linear combination of shifted versions of the exemplary triangular waveforms of FIGS. 3-6.
Figure 10:
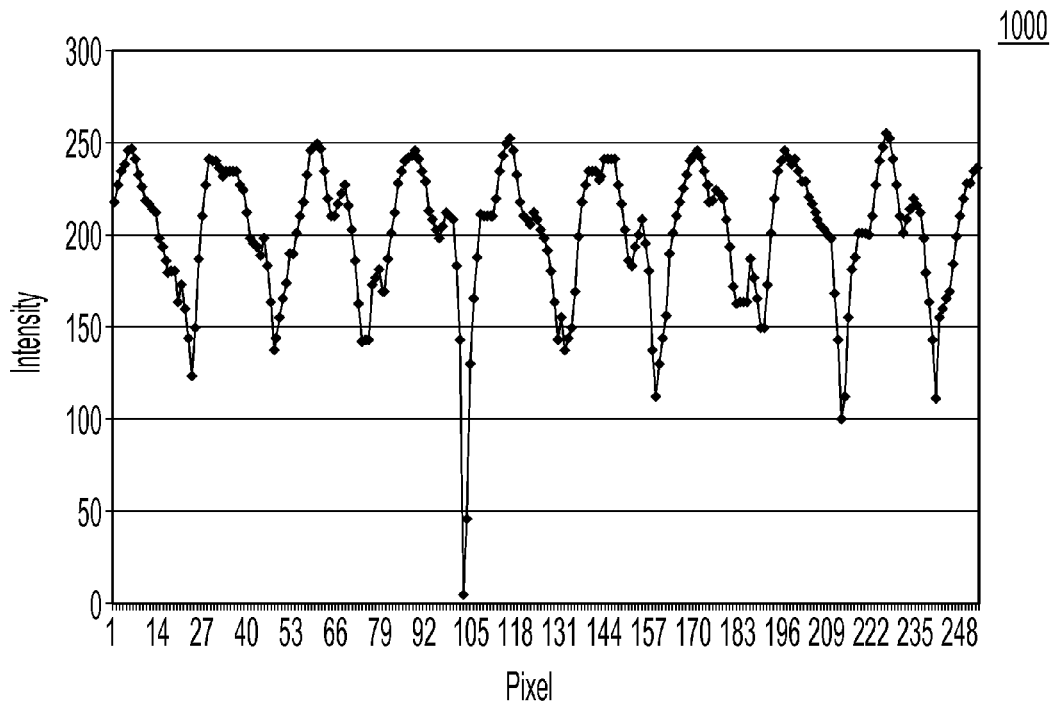
FIG. 10 shows a third waveform pattern derived from a linear combination of shifted versions of the exemplary triangular waveforms of FIGS. 3-6.

While FIG. 8 shows the first illuminating waveform 800, FIG. 9 shows the second illuminating waveform 900 and FIG. 10 shows the third illuminating waveform 1000. Each of these illuminating waveforms results from forming a corresponding aperiodic summed waveform using the phase shifts found in Table 1 and then subjecting each resulting aperiodic summed waveform to the signal conditioning described above. Each of the one-dimensional illuminating waveforms 800, 900 and 1000 may be replicated in a vertical dimension to form a total of three structured light patterns a portion 200 of the first of these appearing in FIG. 2.

The three structured light patterns are output by the projection device 114, one after the other, to illuminate the object 150. The first and second cameras 116, 118 each capture an image of the illuminated object 150, substantially simultaneously, after each such structured light illumination. This results in two images taken from slightly different perspectives (e.g., "left" and "right" camera views) for each such structured light illumination, for a total of six captured images. In a preferred embodiment, the three structured light illuminations and the six image captures occur within less than 0.5 seconds.

In addition to illumination by the three structured light patterns, the object may also be illuminated by unpatterned (non-structured) light from the light projector 114, either before or after the structured light pattern illuminations. This fourth illumination is used to capture object texture (or object color), which may then be used to overlay or "paint" the object upon completion of the 3-D rendering process.

Figure 11:
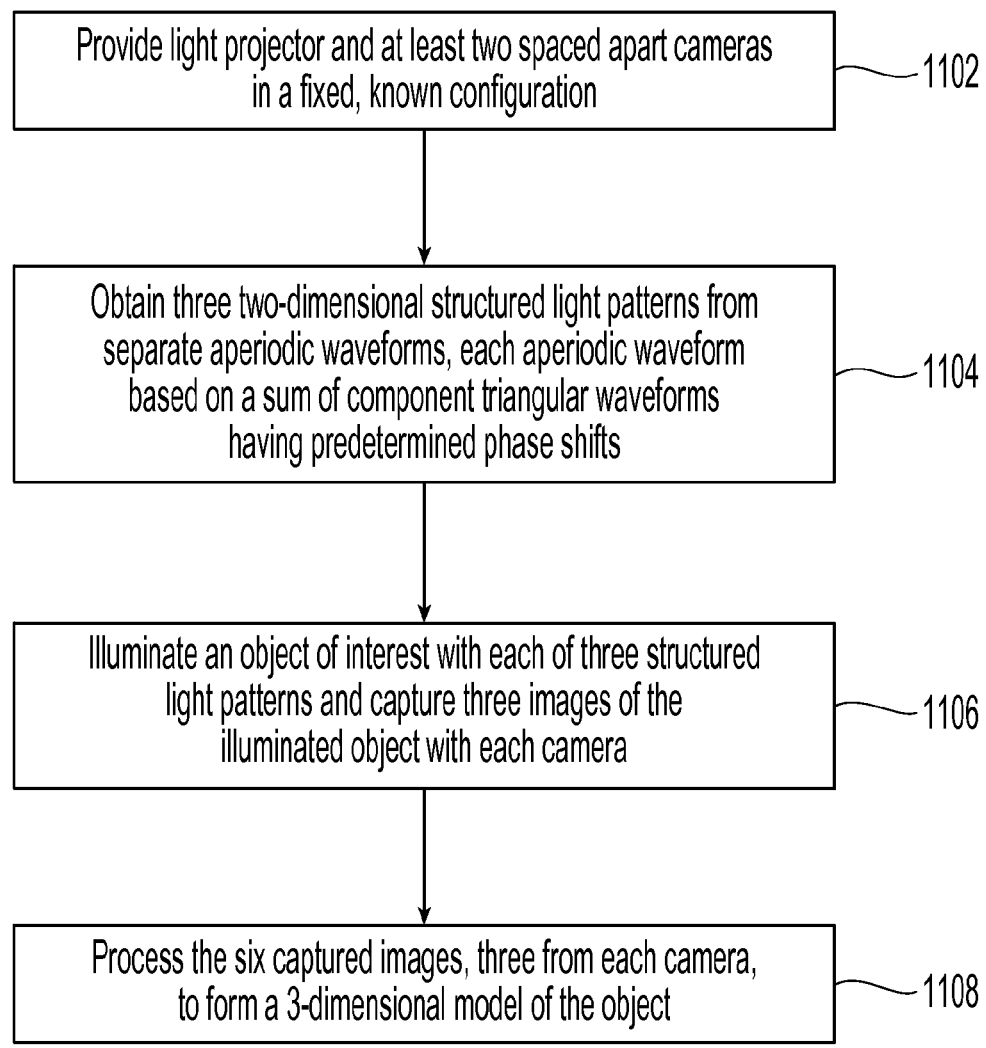
FIG. 11 shows a simplified flow chart of the principal steps for illuminating an object in accordance with one embodiment of the present invention.

FIG. 11 presents a high-level flowchart 1100 of the steps to perform 3-dimensional rendering in accordance with one embodiment of the present invention. In step 1102, the light projector 114 and at least two spaced apart cameras 116, 118 are provided in a fixed, known configuration, such as being rigidly mounted on a common structure, such as housing 102 having unitary construction. In step 1104, three two-dimensional structured light patterns are obtained using separate aperiodic waveforms, each aperiodic waveform based on a sum of component triangular waveforms having predetermined phase shifts. These two-dimensional structured light patterns are stored in memory 138 so that they may be produced, when needed to illuminate an object. In some embodiments, the three two-dimensional structured light patterns are created in advance and stored in the memory 138—i.e., they are "canned", and so need not be produced on the fly. In step 1106, the light projector 114 is fed the three two-dimensional structured light patterns in sequence so as to illuminate the object 150, and capture the reflected light from each such illumination using cameras 116, 118. Finally, in step 1108, the six captured images, three from each camera are processed to form a 3-dimensional model of the object.

Figure 12:
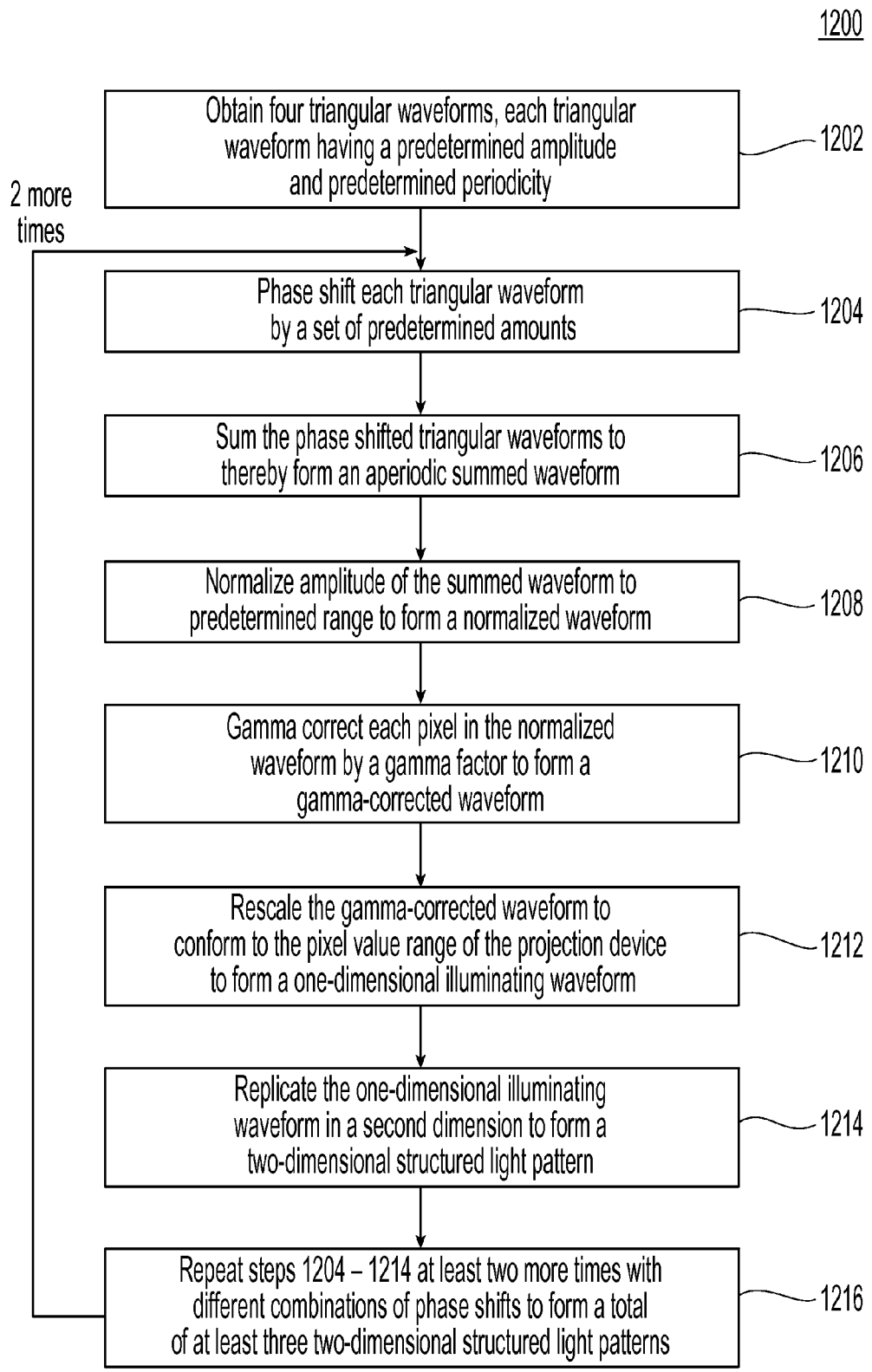
FIG. 12 shows a simplified flow chart for generating structured light patterns for illuminating an object in accordance with the embodiment of FIG. 11.

FIG. 12 presents a detailed flowchart 1200 showing step 1104 of FIG. 11 in detail, in the case where the three structured light patterns must be formed on the fly. In step 1202, four triangular waveforms are obtained, each triangular waveform having a predetermined amplitude and predetermined periodicity. In step 1204, each of the triangular waveforms are phase shifted by a set of predetermined amounts. In step 1206, the phase shifted triangular waveforms are summed to thereby form an aperiodic summed waveform. In step 1208, the amplitudes of the pixel in the summed waveform are normalized to a predetermined range to form a normalized waveform. In step 1210, each pixel in the normalized waveform is modified by a gamma correction factor to a gamma-corrected waveform. In step 1212, the gamma-corrected waveform is rescale so that the pixel values conform to the pixel value range of the projection device, thereby forming a one-dimensional illuminating waveform. Next, in step 1212, the one-dimensional illuminating waveform is replicated in a second dimension to form a two-dimensional structured light pattern. Finally, step 1214 calls for repeated steps 1204-1214 at least two more times with different combinations of phase shifts to form a total of at least three two-dimensional structured light patterns.

As mentioned above, step 1104 is followed by step 1106, in which the object 150 is illuminated by three two-dimensional structured light patterns, and the two cameras 116, 118 capture the reflected light from each of the three illuminations by the light projector 114. The six captured images from the structured light illumination comprise two sets of three captured images, a first or "left" set being captured by the first camera 116, and a second or "right" set being captured by the second camera 118. Furthermore, each captured image comprises an N×M array of 8-bit gray scale pixels and, as stated above N=768 rows and M=1024 columns in one embodiment.

Each of the three captured images in both sets may be subject to preprocessing prior to any 3-D rendering efforts. This preprocessing may entail pixel-by-pixel gamma correction followed by pixel normalization and image filtering. In one embodiment, gamma correction entails raising each pixel value in each of the six captured images to a power of $\gamma=0.9$. After this, each pixel is normalized relative to identically-positioned pixels within the same set of three captured images. In pseudocode, the pixel-by-pixel normalization for the pixels in either set can be expressed as:

```
For (x=0 to 768):
    for (y=0 to 1024):
        Denom=0;
        Denom=     ImgPattern1[x,y]* ImgPattern1[x,y]
                  +ImgPattern2[x,y]* ImgPattern2[x,y]
                  +ImgPattern3[x,y]* ImgPattern3[x,y] ;
        Denom=square root(Denom);
        ImgPattern1[x,y]=ImgPattern1[x,y]/Denom;
        ImgPattern2[x,y]=ImgPattern2[x,y]/Denom;
        ImgPattern3[x,y]=ImgPattern3[x,y]/Denom.
```

After the pixel-by-pixel normalization of the pixels in both sets of captured images, each of the six images is subject to low-pass filtering by convolving with a 9×9 Gaussian filter, whose kernel may be given by the following matrix of values:

Once the image preprocessing is complete, the two sets of three captured images are ready for three-dimensional rendering. Three-dimensional rendering can be performed using a number of well-established algorithms, known to those skilled in the art. Examples of such approaches are mentioned discussed in the aforementioned prior art references, and therefore need not be discussed in detail herein.

In one embodiment, the three-D rendering algorithm begins with obtaining candidate seed values in 3-space for each of the three pairs of images. Given that the locations of the first and second cameras 116, 118, and their respectively focal plane arrays 116a, 118a, relative to one another are known, the algorithm constructs candidate epipolar lines and then looks for matches between the left and right images, in each of the three pairs of images. Points around these candidate seed values are expanded to form a 3-D surface model of the object 150, and there are revisited to refine the 3-D surface model. This is followed by a process for cleaning up isolated points, triangle-shaped clusters and other artifacts. Finally, the 3-D surface model is subject to filtering on a W×W patch-wise basis. This is done by using either a median filter which replaces the pixel value of a 3-D surface pixel having coordinates (x, y, z) with the median X, Y and Z values within a W×W window centered about the coordinate (x, y, z), or an average filter which replaces the pixel value of a 3-D surface pixel having coordinates (x, y, z) with the average X, Y and Z values within a W×W window centered about the coordinate (x, y, z).

Figure 13:
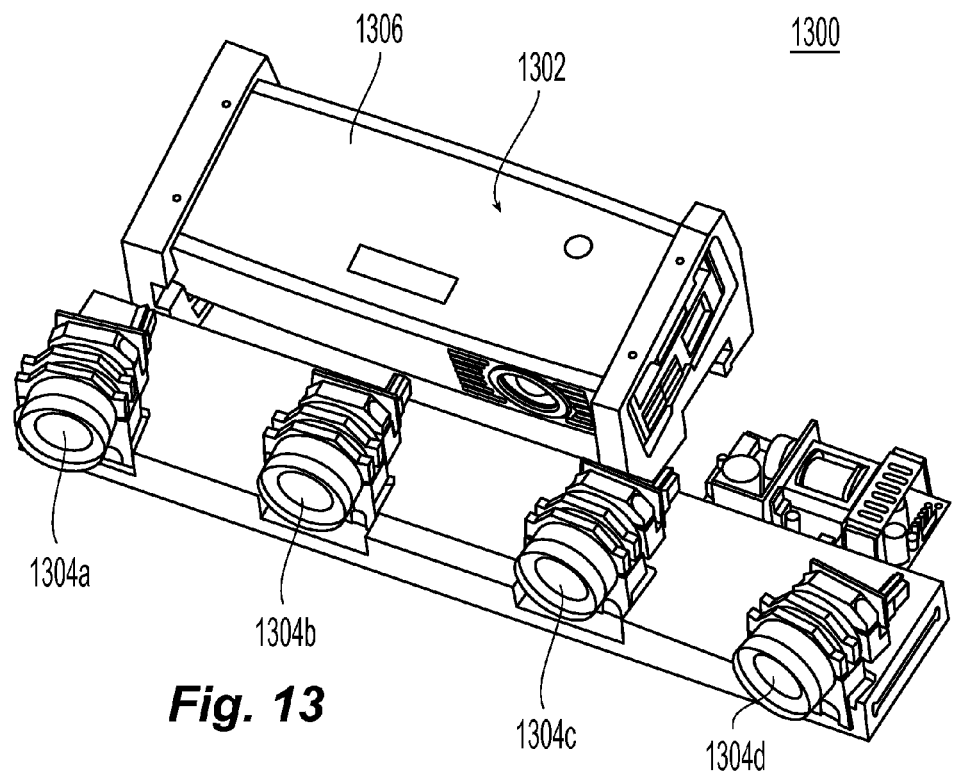
FIG. 13 shows an exemplary embodiment of a light projector in combination with four cameras.

FIG. 13 shows a 3-D rendering system 1300 comprising a light projector 1302 in combination with four cameras 1304a, 1304b, 1304c, 1304d. A computer having the capabilities discussed above may be incorporated into the housing 1306 of the projector 1302. The focal arrays of the four cameras are not in the same geometric plane; however the positions of the focal planes of the four cameras, relative to one another, are known to facilitate processing the various captured image. In this particular embodiment, the focal arrays of the cameras 1304a, 1304b, 1304c, 1304d all have normal vectors which lay in a common plane. Though four cameras are shown in this embodiment, it is understood that other pluralities of cameras, such as 3, 5 or some other number may be employed for 3-dimensional rendering. It is further understood that the cameras need not have normal vectors that all lay in the same plane; the principal criterion being that the positions and orientations of the focal arrays, relative to one another, being known.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

| | | | | | | | | |
|---|---|---|---|---|---|---|---|---|
| 3.520553 | 10.36946 | 22.43158 | 35.63873 | 41.5856 | 35.63873 | 22.43158 | 10.36946 | 3.520553 |
| 10.36946 | 30.54228 | 66.07015 | 104.9706 | 122.4865 | 104.9706 | 66.07015 | 30.54228 | 10.36946 |
| 22.43158 | 66.07015 | 142.9253 | 227.0761 | 264.9672 | 227.0761 | 142.9253 | 66.07015 | 22.43158 |
| 35.63873 | 104.9706 | 227.0761 | 360.7727 | 420.9731 | 360.7727 | 227.0761 | 104.9706 | 35.63873 |
| 41.5856 | 122.4865 | 264.9672 | 420.9731 | 491.219 | 420.9731 | 264.9672 | 122.4865 | 41.5856 |
| 35.63873 | 104.9706 | 227.0761 | 360.7727 | 420.9731 | 360.7727 | 227.0761 | 104.9706 | 35.63873 |
| 22.43158 | 66.07015 | 142.9253 | 227.0761 | 264.9672 | 227.0761 | 142.9253 | 66.07015 | 22.43158 |
| 10.36946 | 30.54228 | 66.07015 | 104.9706 | 122.4865 | 104.9706 | 66.07015 | 30.54228 | 10.36946 |
| 3.520553 | 10.36946 | 22.43158 | 35.63873 | 41.5856 | 35.63873 | 22.43158 | 10.36946 | 3.520553 |

What is claimed is:

1. A method of illuminating an object in preparation for three-dimensional rendering, comprising:
providing a light projector having a field of view which includes said object;
creating three two-dimensional structured light patterns, each structured light pattern being derived from a corresponding aperiodic waveform replicated in a second dimension, each aperiodic waveform being derived from the same set of component triangular waveforms, wherein a given aperiodic waveform is created using a unique set of phase shifts applied to members of said same set of component triangular waveforms; and
illuminating said object with each of the three two-dimensional structured light patterns, in succession.

2. The method according to claim 1, wherein:
each of the component triangular waveforms has a unique periodicity, with no periodicity being an exact multiple of another periodicity.

3. The method according to claim 2, wherein:
at least three component triangular waveforms are summed to form each of said aperiodic waveforms.

4. The method according to claim 3, wherein:
exactly four component triangular waveforms are summed to form each of said aperiodic waveforms.

5. The method according to claim 1, wherein:
each component triangular waveform comprises a train of isoceles triangles.

6. The method according to claim 1, wherein:
each aperiodic waveform is subject to signal conditioning, prior to creating the three two-dimensional structured light patterns.

7. The method according to claim 6, wherein said signal conditioning includes:
gamma correcting pixels of said each periodic waveform; and
rescaling pixels of said each periodic waveform in accordance with a capability of the light projector.

8. The method according to claim 1, wherein said step of creating comprises:
(a) obtaining four triangular waveforms, each triangular waveform having a predetermined amplitude and predetermined periodicity;
(b) phase shifting each triangular waveform by a predetermined amount;
(c) summing the phase shifted triangular waveforms to thereby form an aperiodic summed waveform;
(d) gamma correcting each pixel in the aperiodic summed waveform; by a gamma factor to form a gamma-corrected waveform;
(e) rescaling the gamma-corrected waveform to conform to the pixel value range of the projection device, thereby forming a one-dimensional illuminating waveform;
(f) replicating the one-dimensional illuminating waveform in a second dimension to form a two-dimensional structured light pattern; and
(g) repeating steps (b)-(f) at least two more times with different combinations of phase shifts to form a total of at least three two-dimensional structured light patterns.

9. A method of performing three-dimensional rendering of an object, comprising:
providing a light projector and at least two spaced apart cameras in a known configuration relative to one another, wherein the object is within a field of view of said light projector and also said at least two spaced apart cameras;
creating three two-dimensional structured light patterns, each structured light pattern being derived from a corresponding aperiodic waveform replicated in a second dimension, each aperiodic waveform being derived from the same set of component triangular waveforms, a given aperiodic waveform being created using a unique set of phase shifts applied to members of said same set of component triangular waveforms;
illuminating the object with each of the three two-dimensional structured light patterns and capturing three images of illuminated object with each camera to thereby from a plurality of sets of three images, each set of three images being captured by one camera; and
processing the plurality of sets of images to form a three-dimensional surface model of the object.

10. The method according to claim 9, wherein:
each of the component triangular waveforms has a unique periodicity, with no periodicity being an exact multiple of another periodicity.

11. The method according to claim 10, wherein:
at least three component triangular waveforms are summed to form each of said aperiodic waveforms.

12. The method according to claim 11, comprising:
providing exactly two cameras; and
summing exactly four component triangular waveforms to form each of said aperiodic waveforms.

13. The method according to claim 9, wherein:
each component triangular waveform comprises a train of isoceles triangles.

14. The method according to claim 9, wherein:
each aperiodic waveform is subject to signal conditioning, prior to creating the three two-dimensional structured light patterns.

15. The method according to claim 14, wherein said signal conditioning includes:
gamma correcting pixels of said each periodic waveform; and
resealing pixels of said each periodic waveform in accordance with a capability of the light projector.

16. The method according to claim 9, wherein said step of creating comprises:
(a) obtaining four triangular waveforms, each triangular waveform having a predetermined amplitude and predetermined periodicity;
(b) phase shifting each triangular waveform by a predetermined amount;
(c) summing the phase shifted triangular waveforms to thereby form an aperiodic summed waveform;
(d) gamma correcting each pixel in the aperiodic summed waveform; by a gamma factor to form a gamma-corrected waveform;
(e) rescaling the gamma-corrected waveform to conform to the pixel value range of the projection device, thereby forming a one-dimensional illuminating waveform;
(f) replicating the one-dimensional illuminating waveform in a second dimension to form a two-dimensional structured light pattern; and
(g) repeating steps (b)-(f) at least two more times with different combinations of phase shifts to form a total of at least three two-dimensional structured light patterns.

17. A computer memory having stored thereon a set of three two-dimensional structured light patterns, each structured light pattern comprising a plurality of pixels having pixel intensities which vary in a first dimension and are constant in a second dimension, wherein:

each structured light pattern is derived from a corresponding aperiodic waveform replicated in a second dimension;

each aperiodic waveform is derived from the same set of component triangular waveforms; and a given aperiodic waveform is created using a unique set of phase shifts applied to members of said same set of component triangular waveforms.

18. The two-dimensional structured light pattern according to claim 17, wherein:

the pixel intensities along said first dimension comprise a distorted version of a sum of said set of component triangular waveforms.

19. The two-dimensional structured light pattern according to claim 18, wherein said distorted version comprises pixels which have been gamma corrected and then rescaled in accordance with a capability of the light projector.

20. A structured light system capable of illuminating an object in preparation for three-dimensional rendering, comprising:

a light projector; and a computer memory coupled to the light projector and having stored thereon a set of three two-dimensional structured light patterns, each structured light pattern comprising a plurality of pixels having pixel intensities which vary in a first dimension and are constant in a second dimension, wherein:

each structured light pattern is derived from a corresponding aperiodic waveform replicated in a second dimension;

each aperiodic waveform is derived from the same set of component triangular waveforms; and a given aperiodic waveform is created using a unique set of phase shifts applied to members of said same set of component triangular waveforms.

21. The structured light system according to claim 20, further comprising:

a computer; and at least two digital cameras configured to feed output to the computer, wherein the relative positions of focal planes of the cameras are known to the computer.

* * * * *